US008636175B2

(12) United States Patent
Smith

(10) Patent No.: US 8,636,175 B2
(45) Date of Patent: Jan. 28, 2014

(54) FLUID DISPENSING SYSTEM WITH THERMAL CONTROL

(76) Inventor: Clyde M. Smith, Nashville, TN (US)

( * ) Notice: Subject to any disclaimer, the term of this patent is extended or adjusted under 35 U.S.C. 154(b) by 38 days.

(21) Appl. No.: 13/318,929

(22) PCT Filed: May 7, 2010

(86) PCT No.: PCT/US2010/033986
§ 371 (c)(1),
(2), (4) Date: Jan. 19, 2012

(87) PCT Pub. No.: WO2010/129841
PCT Pub. Date: Nov. 11, 2010

(65) Prior Publication Data
US 2012/0111888 A1 May 10, 2012

Related U.S. Application Data

(60) Provisional application No. 61/215,581, filed on May 7, 2009.

(51) Int. Cl.
*B67D 1/00* (2006.01)
(52) U.S. Cl.
USPC ............ 222/54; 222/1; 222/52; 222/129.1; 222/129.2; 222/146.1; 222/146.2; 222/146.6
(58) Field of Classification Search
USPC ............ 222/1, 52, 54–55, 57, 61, 71, 129, 222/129.2–129.4, 146.1, 146.2, 146.6, 132, 222/145.5; 137/87.01, 98, 101, 101.19, 137/103, 334, 340
See application file for complete search history.

(56) References Cited

U.S. PATENT DOCUMENTS

| 4,527,353 | A | * | 7/1985 | Newby | 47/59 R |
| 4,830,737 | A | | 5/1989 | Cole, Jr. | |
| 4,886,190 | A | * | 12/1989 | Kirschner et al. | 222/57 |
| 6,135,319 | A | * | 10/2000 | Camezon | 222/52 |
| 6,779,685 | B2 | * | 8/2004 | Nelson | 222/1 |
| 7,077,290 | B2 | * | 7/2006 | Bethuy et al. | 222/23 |
| 7,156,259 | B2 | * | 1/2007 | Bethuy et al. | 222/57 |
| 8,083,104 | B2 | * | 12/2011 | Roetker et al. | 222/146.1 |
| 8,220,660 | B2 | * | 7/2012 | Smith | 222/57 |
| 2004/0112455 | A1 | | 6/2004 | Nelson | |
| 2005/0072800 | A1 | * | 4/2005 | Smith | 222/129.2 |
| 2008/0314450 | A1 | | 12/2008 | Hawker et al. | |
| 2008/0314452 | A1 | | 12/2008 | Smith | |
| 2009/0194604 | A1 | * | 8/2009 | Smith | 239/1 |

OTHER PUBLICATIONS

International Search Report from the United States Patent Office for International Application No. PCT/US2010/033986, (mailing date Jul. 9, 2010).

* cited by examiner

*Primary Examiner* — Frederick C Nicolas
(74) *Attorney, Agent, or Firm* — Finnegan, Henderson, Farabow, Garrett & Dunner, L.L.P.

(57) ABSTRACT

A system for dispensing fluid may include a first fluid circuit and second fluid circuit. The first fluid circuit may include a first reservoir configured to contain a supply of first fluid for being dispensed and a first variable volume chamber in flow communication with the first fluid circuit. The second fluid circuit may be configured to provide pressure for dispensing the first fluid. The second fluid circuit may include a second reservoir, a pump, fluid passages configured to provide fluid flow within the second fluid circuit, and a second variable volume chamber in flow communication with the second fluid circuit. The second fluid circuit may be a closed-loop circuit, and the first variable volume chamber and the second variable volume chamber are associated with one another, such that flow of fluid in the second circuit controls dispensing and temperature of the first fluid in the first fluid circuit.

22 Claims, 2 Drawing Sheets

FLUID DISPENSING SYSTEM WITH THERMAL CONTROL

CLAIM OF PRIORITY/INCORPORATION BY REFERENCE

This PCT International Application claims the right of priority to, and hereby incorporates by reference herein in its entirety, U.S. Provisional Application No. 61/215,581, filed May 7, 2009.

FIELD OF THE DISCLOSURE

The present disclosure relates to a fluid dispensing system. In particular, the present disclosure relates to a fluid dispensing system with thermal control.

BACKGROUND OF THE DISCLOSURE

There are a number of situations in which it may be desirable to dispense fluid in a controlled manner and such that the temperature of the dispensed fluid may be controlled, either before or during dispensing. For example, in the field of beverage dispensing, it is often desirable to be able to both dispense the beverage and control the temperature of the dispensed beverage. For example, it may be desirable to dispense beverages such as, for example, beer and soft drinks, in a cold condition, while in contrast, it may be desirable to dispense beverages, such as, for example, coffee and hot chocolate, in a warm or hot condition.

Another example of a situation in which it may be desirable to dispense a fluid in a controlled manner such that temperature of the fluid is controlled is for exhaust emissions control systems for vehicles. For example, in order to reduce nitrous oxide (NOX) emissions from the exhaust of a compression ignition engine (e.g., a diesel engine), a selective catalytic reduction system (SCR) may be used. In some SCR systems, a urea and water solution, for example, is sprayed into the hot exhaust gas upstream of a catalytic converter, thereby reducing NOX emissions. However, the use of urea-water solutions may exhibit some potential drawbacks, including, for example, the solution freezing at low temperatures and being of a corrosive nature. For example, in cold conditions, the urea-water solution may freeze, preventing an SCR system from spraying the urea-water solution into the exhaust until it has been thawed. In cold conditions, such thawing may take an undesirable length of time.

Therefore, it may be desirable to provide a fluid dispensing system in which the amount and/or timing of the dispensing of the fluid may be controlled in a manner sufficient for an intended purpose. Further, it may be desirable to provide a fluid dispensing system in which the temperature of the fluid may be controlled.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a system for dispensing fluid. The system may include a first fluid circuit, and the first fluid circuit may include a first reservoir configured to contain a supply of a first fluid for being dispensed and a first variable volume chamber in flow communication with the first fluid circuit. The first variable volume chamber may be configured to increase and decrease in volume. The system may further include a second fluid circuit configured to provide pressure for dispensing the first fluid. The second fluid circuit may include a second reservoir configured to contain a supply of a second fluid, a pump configured to pump the second fluid within the second fluid circuit, fluid passages configured to provide fluid flow within the second fluid circuit, and a second variable volume chamber in flow communication with the second fluid circuit, the second variable volume chamber being configured to increase and decrease in volume. The second fluid circuit may be a closed-loop circuit, and the first variable volume chamber and the second variable volume chamber may be associated with one another, such that as the volume of the second variable volume chamber increases, the volume of the first variable volume chamber decreases, thereby dispensing the first fluid from the first fluid circuit. The fluid passages of the second fluid circuit may be associated with the first fluid circuit, such that flow of the second fluid in the second fluid circuit facilitates control of the temperature of the first fluid in the first fluid circuit.

According to another aspect, a method for controlling dispensing and temperature of a first fluid in a first fluid circuit via flow of a second fluid in a second fluid circuit may include flowing the second fluid in a closed-loop fluid circuit. The method may further include controlling temperature of the second fluid and controlling pressure of the second fluid. Flowing the second fluid may result in affecting the temperature and flow of the first fluid in the first fluid circuit.

According to yet another aspect, a selective catalytic reduction system may include a system for dispensing a fluid as disclosed herein.

In still a further aspect, a beverage dispensing system may include a system for dispensing fluid as disclosed herein.

Some possible objects and advantages of the disclosure will be set forth in part in the description which follows, and may be learned by practice of the disclosed embodiments.

Aside from the structural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

DESCRIPTION OF EXEMPLARY EMBODIMENTS

Figure 1:
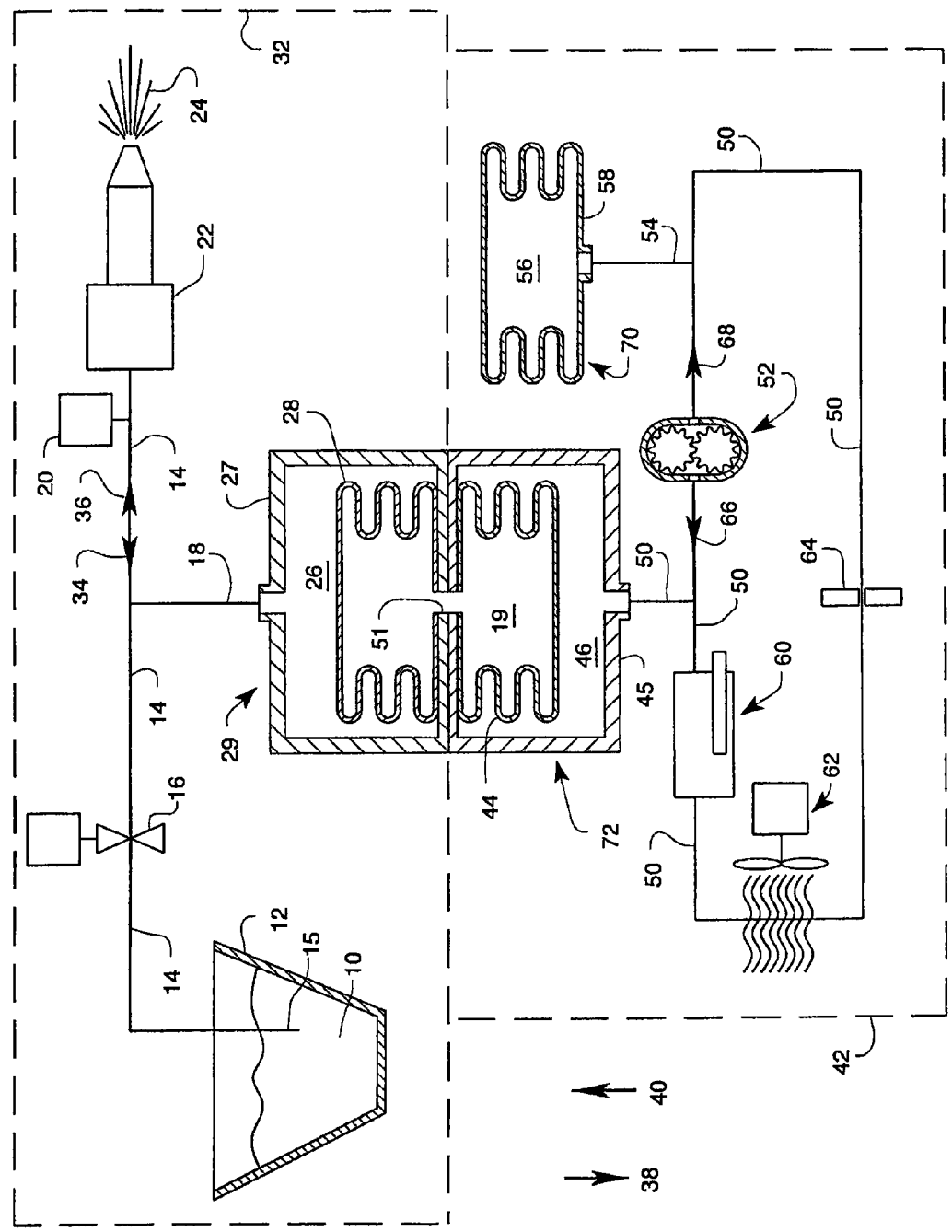
FIG. 1 is a schematic diagram of an exemplary embodiment of a system for dispensing fluid.

Reference will now be made in detail to exemplary embodiments. Wherever possible, the same reference numbers are used in the drawings and the description to refer to the same or like parts.

According to some embodiments of systems for dispensing fluids, the system may include first and seconds fluids, with the first fluid being dispensed and the second fluid being used to facilitate dispensing of the first fluid. According to some embodiments, the second fluid may also be used to control the temperature of the first fluid. For example, for situations in which it is desirable to dispense an intermittent spray of the first fluid, the rate of spray may be controlled by pulse-width-modulation. Examples of such situations may include, but are not limited to, beverage dispensing and operation of an SCR-emission control system on, for example, a compression ignition engine (e.g., a diesel engine), where a urea-water solution may be subject to freezing.

For example, FIG. 1 schematically depicts an exemplary embodiment of a fluid dispensing system that is configured to operate as an SCR-emission control system. The exemplary embodiment includes a first fluid circuit and a second fluid circuit that is independent from the first fluid circuit in a manner such that the respective fluids of the two systems do not mix.

As shown in FIG. 1, the exemplary embodiment includes a first fluid circuit comprising a urea-water circuit, as shown enclosed within dashed line 32. The exemplary urea-water circuit includes a urea-water reservoir 12 for containing a supply of urea-water solution 10. Submerged in urea-water solution 10 is an open end 15 of tubing 14, which provides flow communication to valve 16, which may be a solenoid valve. The exemplary system includes a pulse pump 29, and pulse pump 29 may include a housing 27, which contains a variable volume chamber 26. Chamber 26 is in flow communication with tubing 18, which joins to and communicates with tubing 14. The exemplary system includes a pressure transducer 20, which is in flow communication with tubing 14, and valve 22 (e.g., a solenoid valve) associated with a spray nozzle, both of which are in flow communication with tubing 14. The exemplary nozzle is configured to cause a portion of urea-water solution to exit the first fluid circuit in the form of, for example, spray droplets 24 from the nozzle.

The second exemplary fluid circuit comprises a thermal circuit, as shown enclosed within dashed line 42. The exemplary thermal circuit includes a supply of a thermal fluid, such as, for example, ethylene glycol and/or oil, or another fluid known in the art that is resistant to freezing. According to some embodiments, the thermal fluid may be any fluid that maintains its fluid state at a temperatures as low as, for example, minus 40 degrees C. A supply of the thermal fluid may be contained within a variable volume reservoir 70, which may include a flexible membrane 58 containing therein a variable volume chamber 56. Variable volume chamber 56 is in flow communication with tubing 54, which is in flow communication with tubing 50. Tubing 50 is in flow communication with a pump 52, and tubing 50 extends and provides flow communication with a pulse motor 72. Exemplary pulse motor 72 includes a housing 45, which contains a variable volume chamber 46. A flexible barrier assembly isolates chamber 26 from chamber 46 and includes flexible membrane 28, thermal fluid 19, and a flexible membrane 44. The exemplary system is configured such that fluid 19 moves freely between pulse motor 72 and pulse pump 29 via passageway 51 in housing 27 and housing 45 of pulse pump 29. The exemplary barrier assembly acts to separate variable volume chamber 26 from variable volume chamber 46, so that as the volume in variable volume chamber 46 increases, the volume in variable volume chamber 26 decreases. Likewise, as the volume in variable volume chamber 26 decreases, the volume in variable volume chamber 46 increases. Tubing 50 is in flow communication with heater 60 (e.g., an electrical heater) and/or radiator 62. The exemplary system includes a flow restrictor 64, and tubing 50 provides flow communication with flow restrictor 64 and chamber 56 via tubing 54, thereby completing a circuit of the second fluid circuit.

During exemplary operation, the second fluid circuit circulates a thermal fluid that may be heated and/or cooled via flow through the circuit. The exemplary second fluid circuit may include a pump 52 that is bi-directional, such that it may establish fluid flow in direction 66 and/or direction 68, as shown. When unrestrained by the first fluid circuit (e.g., the urea-water circuit), flow in direction 66 increases the volume of variable volume chamber 46, which decreases the volume of variable volume chamber 56, for example, by a similar amount or the same amount. When unrestrained by the first fluid circuit, flow in direction 68 increases the volume of variable volume chamber 56, which decreases the volume of variable volume chamber 46, for example, by a similar amount or the same amount. When fluid flow is in direction 66, resistance provided by flow restrictor 64 results in increased pressure in a segment of tubing 50 located between pump 52 and flow restrictor 64. This pressure may be increased by increasing the speed of pump 52, or the pressure may be decreased by reducing the speed of pump 52. A controller (not shown) may be used to control the speed of pump 52. For example, the controller may be configured to receive a signal from pressure transducer 20 in first fluid circuit and control the speed of pump 52 in response to the signal. The controller may also control the direction fluid flow through pump 52, for example, by reversing pump 52's direction of rotation.

When unrestrained by the first fluid circuit (e.g., a urea-water circuit), flow in direction 68 increases the volume of variable volume chamber 56 and decreases the volume of variable volume chamber 46 by a similar amount or the same amount. As a result, changing the direction of pump 52 results in a reciprocating motion as the volume of chamber 46 cyclically increases and decreases. This reciprocating motion acts as the motor characteristic of pulse motor 72.

During exemplary operation, variable chamber 46 may be mechanically linked to variable chamber 26 via the barrier assembly, so that an increase or decrease in the volume of chamber 46 affects the volume of chamber 26 in an inverse manner. The barrier assembly also acts to separate the first fluid (e.g., the urea-water solution) of chamber 26 from the second fluid (e.g., the thermal fluid) of chamber 46. Pressure developed in chamber 46 is transferred in chamber 26 via the barrier assembly, less the pressure drop that may result from hysteresis and friction of the barrier assembly. According to this exemplary embodiment, a urea-water circuit may be capable of dispensing a metered volume of urea-water solution as a spray. According to the exemplary embodiment shown, the urea-water circuit may be capable of bi-directional flow (i.e., flow from reservoir 12 toward the spray nozzle, and from the spray nozzle toward reservoir 12). According to some embodiments, the first fluid circuit may be capable of pumping air as well as fluid.

During exemplary operation, the cyclically increasing and decreasing volume of chamber 26 is the basis for pumping action in the urea-water circuit. Valve 16 (e.g., a solenoid valve) and valve 22 (e.g., a solenoid valve) may establish pumping direction by selectively blocking and unblocking segments of tubing 14 responsive to a controller.

An exemplary fill operation may begin from a state where all (or a substantial portion) of the urea-water solution 10 is located in reservoir 12, and where tubing 14, tubing 18, chamber 26 (at minimum volume), and valve 22 are filled with air. During the fill operation, responsive to a controller, pump 52 may start, establishing flow and operation of, for example, the thermal circuit (i.e., the second fluid circuit). Should the air temperature be cold enough to freeze the urea-water solution, then responsive to a controller, a heater 60 may turn on and thaw at least a portion of the urea-water solution, warm a urea-water circuit, or both. Responsive to a controller, valve 22 closes, valve 16 opens, and chamber 26 increases in volume due action by the thermal circuit. Fluid 10 is drawn from reservoir 12 into chamber 26 since both are in flow communication. Upon maximum increase in volume of chamber 26 and responsive to a controller, valve 22 opens, valve 16 closes, and chamber 26 decreases in volume due to action by the thermal circuit. Residual air in chamber 26, tubing 18, tubing 14, and the valve 22 exits through the spray nozzle. When urea-water solution reaches the spray nozzle, a pressure rise occurs due to the different frictional characteristics of air and fluid. This pressure rise may be detected by pressure transducer 20, and a signal may be sent to the controller. The controller may close valve 22. As a result of this exemplary operation, the urea-water circuit is purged of air and filled or primed with a urea-water solution.

An exemplary spray operation may begin from a state where tubing 14, tubing 18, chamber 26, and the valve associated with the spray nozzle are filled with urea-water solution, and where valve 16 and valve 22 are closed. During the spray operation, by action of pulse motor 72 of the thermal circuit on pulse pump 29 of the urea-water circuit, the pressure of chamber 26 increases to operational pressure, for example, about 90 pounds per square inch. In response to the controller, valve 22 associated with the spray nozzle opens for a timed period, emitting a spray 24, and then closes and terminates spaying from the spray nozzle. By virtue of the repeated opening and closing of the valve 22 associated with the spray nozzle, spray 24 may be metered into an engine exhaust (e.g., a compression ignition engine exhaust) as a pulse-width-modulated spray.

At some point, it may be desirable to replenish chamber 26 with additional urea-water solution to make up for the amount sprayed. Responsive to the controller and by action of pulse motor 72 of the thermal circuit on pulse pump 29 of the urea-water circuit, valve 22 closes, valve 16 opens, and chamber 26 increases in volume, thereby drawing in a fresh charge of urea-water solution from reservoir 10. When chamber 26 reaches an increased or maximum volume, valve 16 closes, and the urea-water circuit is then ready to resume spraying responsive to the controller.

When the engine is turned off, the thermal circuit may continue to circulate thermal fluid for some length of time to remove heat from the spray nozzle to prevent overheating or urea clinker formation. During this period, the urea-water circuit need not operate. Both valve 16 and valve 20 may be closed, thereby blocking urea-water flow. As a normal routine in a shut-down operation or in response to a temperature sensor detecting near freezing conditions, actions such as returning a urea-water solution to a reservoir 12 to prevent freeze damage may be initiated by the controller. At this point, responsive to the controller and by action of pulse motor 72 of the thermal circuit on pulse pump 29 of the urea-water circuit, valve 22 remains closed, valve 16 opens, and chamber 26 decreases in volume, thereby discharging its contents back into reservoir 12. To clear valve 22, valve 16 closes, valve 22 opens, and chamber 26 increases in volume, thereby displacing the urea-water solution with air.

Figure 2:
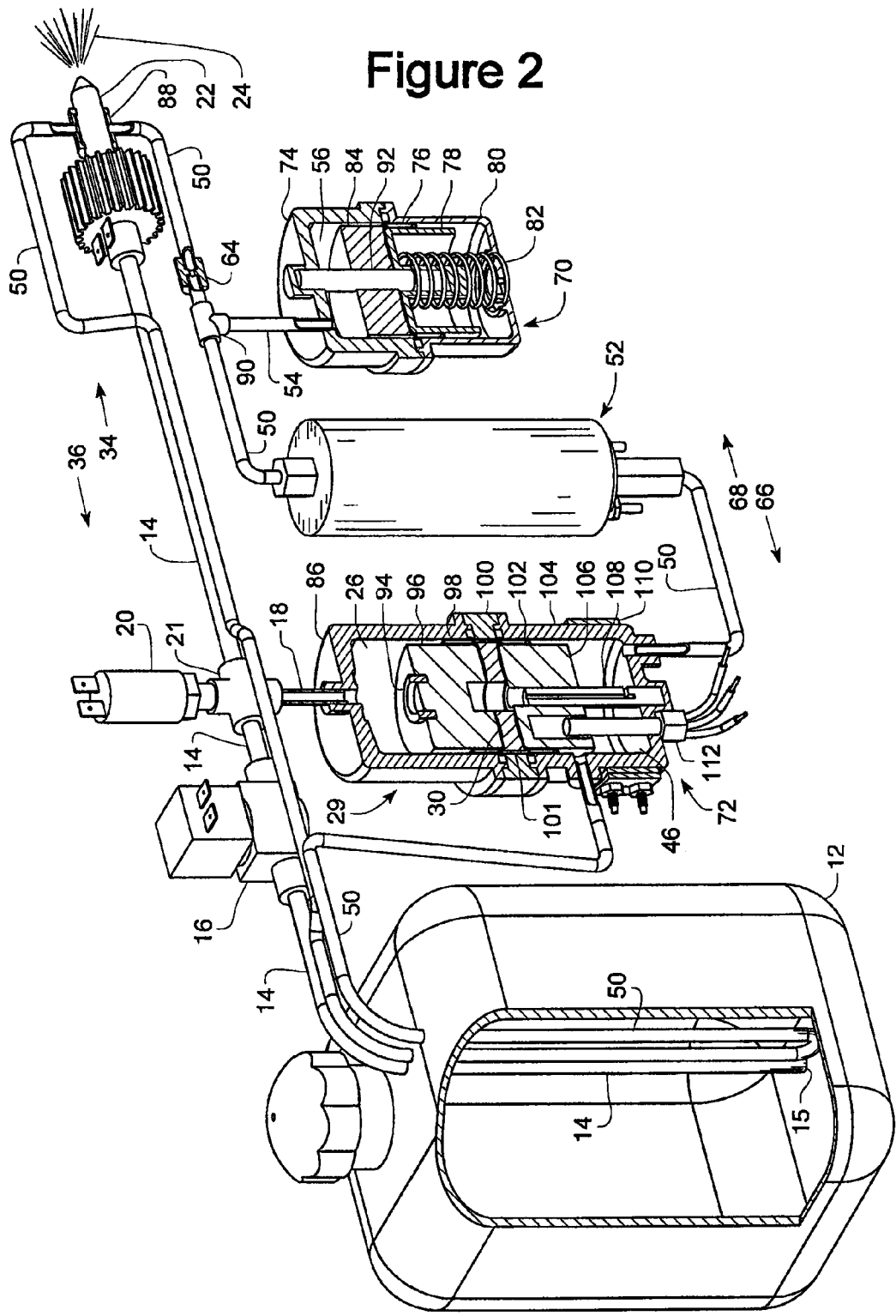
FIG. 2 is a schematic, perspective view of another exemplary embodiment of a system for dispensing fluid.

FIG. 2 is a schematic, perspective view showing an exemplary embodiment of an SCR-emission control system with a urea-water circuit grouped with a thermal fluid circuit. Controller and wiring to electrical components are omitted for clarity. According to some embodiments, the controller for the exemplary SCR system may be a subsystem of the engine (e.g., a compression ignition engine). Although higher voltages may be used, a typical electrical system may be a 12 or 24 volt DC system.

The exemplary system for dispensing fluid shown in FIG. 2 is a urea-water circuit with tubing 14 that connects reservoir tank 12 at one end to valve 22 (e.g., a solenoid valve) associated with the spray nozzle at the other end, and provides flow communication therebetween. A urea-water solution may enter and exit reservoir 12 via end opening 15 of tubing 14. Included in a urea-water circuit is valve 16 (e.g., a solenoid valve), a tubing fitting 21, pressure transducer 20, pulse pump 29, and valve 22.

In the exemplary embodiment shown in FIG. 2, the system may include a thermal fluid circuit that is closed-loop, such that no fluid is lost or gained during normal operation. The exemplary thermal circuit includes tubing 50, which generally follows (e.g., traces) tubing and components of the urea-water circuit, such that the thermal circuit may act to add or remove heat from the urea-water circuit. For example, pump 52 may be driven by a motor (not shown), and is in flow communication with pulse motor 72 via tubing 50. Tubing 50 proceeds along (e.g., adjacent and/or in contact with) reservoir 12 and into reservoir 12, where it makes, for example, a tight loop, then closely follows tubing 14 and the components of the urea-water circuit, including valve 22. At valve 22, tubing 50 may join a thermal jacket 88 before proceeding to flow restrictor 64. Thermal jacket 88 is configured to provide additional heat transfer capability to thermal circuit. From flow restrictor 64, tubing 50 proceeds to a fitting 90 (e.g., a T-fitting), where thermal fluid reservoir 70 is in flow communication with tubing 50 via tubing 54. Tubing 50 continues from fitting 90 to pump 52, where a closed loop is completed.

In the exemplary embodiment shown in FIG. 2, the interface of pulse pump 29 and pulse motor 72 are joined and linked, yet maintain a separation of the urea-water solution from the thermal fluid of the thermal circuit. Pulse pump 29 and pulse motor 72 include within pump 29 a variable volume chamber 26 defined by housing 86, piston 96, and diaphragm 98 (e.g., a rolling diaphragm). Pulse motor 72 includes a variable volume chamber 46 defined by housing 104, piston 106, and diaphragm 102 (e.g., a rolling diaphragm). Piston 96 and piston 106 are joined together by a spacer 30, and housing 86 and housing 104 are joined together by a spacer 100. A chamber 101 is defined by diaphragm 98, diaphragm 102, spacer 100, and spacer 30. Chambers 26, 101, and 46 are fluidly isolated from one another. Chamber 26 is configured to hold (e.g., be filled with) air and/or a urea-water solution. Chambers 101 and 46 are configured to hold (e.g., be filled with) a thermal fluid, such as, for example, ethylene glycol or similar fluid. Chamber 101 maintains the shape of diaphragms 98 and 102 during strokes and pressure reversals. A piston guide 108 slidably engages piston 106 and is fixed to housing 104. A limit switch 112 for detecting when the piston 106 has reached the end of its stroke is fixed to housing 104, and is positioned to detect location of piston 106.

Chamber 46 is hydraulically balanced with chamber 101, and chamber 101 is hydraulically balanced with chamber 26. The hydraulic balance of chamber 26 is maintained at the end of its stroke by a seal 94, which seals against housing 86. By maintaining a hydraulic balance, the stress within diaphragms 98 and 102 may be reduced, thereby possibly extending diaphragm life. A band heater 110 is attached to housing 104 to introduce heat into the thermal fluid, pulse motor 72, and pulse pump 29.

The exemplary thermal fluid reservoir 70 includes variable volume chamber 56, which is defined by housing 74, piston 84, and diaphragm 76 (e.g., a rolling diaphragm). Piston guide 92 slidably engages piston 84 and is fixed to housing 74. Housing 80 attaches to housing 74, and piston 78 attaches to piston 84. Spring 82 bears against piston 78 and housing 80, thereby biasing the piston assembly. The force provided by spring 82 raises the pressure of chamber 56 slightly above atmospheric pressure, thereby assisting to maintain the form of diaphragm 76 as the volume of chamber 56 increases and decreases.

During exemplary operation, the thermal fluid of the thermal circuit flows in direction 66 in tubing 50 at pump 52, which may be driven by, for example, an electric motor (not shown). The pressure of the thermal fluid at the discharge of pump 52 is approximately equal to the pressure in the urea-water circuit between valve 16 and valve 22. This pressure transfer is enabled via the moveable piston assembly, including piston 96, spacer 30, and piston 106, which is sealed by diaphragms 98 and 102. Hysteresis and friction of the piston assembly is low, and even small volume reductions in chamber 26 may be readily accommodated.

The thermal fluid flow rate greatly exceeds the instantaneous flow rate of urea-water exiting the urea-water circuit as spray 24. As a result, the pressure drop as valve 22 opens to meter the urea-water solution by pulse-width-modulation is minimal and can be compensated.

During exemplary operation, pump 52 is anticipated to run continuously, except when stopping to reverse direction. The flow direction of a thermal fluid is overwhelmingly in direction 66 relative to direction 68, for direction 66 provides the power to spray the urea-water solution, while direction 68 provides power to fill pressurized pulse pump (urea-water reservoir) 29, which is a brief operation. While a urea-water solution is sprayed out, pressurized urea-water solution in pulse pump 29 is slowly depleted. When fully depleted as detected by, for example, a limit sensor 112, pump 52 reverses, and a volume of the thermal fluid is quickly exchanged between pulse motor 72 and thermal fluid reservoir 70 for the purpose of replenishing urea-water pulse pump 29. When urea-water pulse pump 29 is replenished as determined by limit sensor 112, pump 52 again reverses direction for fluid flow in direction 66 to pressurize urea-water pulse pump 29 and allow resumption of a metered spray 24 of the urea-water solution. This exemplary, cyclical operation may be alternatively described as a long dispense pulse followed by a short replenishment pulse. In some embodiments, end of stroke detection or action may be accomplished by other means, including, for example, a piston position transducer, a timing cycle, a pressure transducer, and/or a pressure switch.

Some embodiments may include additional components. For example, a fluid level sensor may be installed in the urea-water reservoir to help avoid the negative consequences of depleting the urea-water supply. A bi-directional thermal fluid pump may be substituted with a uni-directional pump and valving configured to reverse flow. The pulse pump and/or pulse motor may cause detectable changes of state at the end of the stroke, which may serve as an input to the controller in addition to the position sensor. Such changes of state may include, for example, pressure in the urea-water circuit, pressure in the thermal fluid circuit, speed and/or power consumption of a motor used to power the pump 52, which are all detectable via conventional sensors.

According to some embodiments, an independently operable, active thermal management circuit may broaden potential configurations, including insulating a urea-water reservoir and/or using a thermal fluid with heater and radiator components used to regulate temperature, and/or inclusion of phase change material to store and deliver additional heating or cooling capacity.

According to some exemplary embodiments, the system may allow addition of additional spray nozzles or thermal fluid pumps to achieve further reliability and/or redundancy without significant change to the operational scheme. With respect to the nozzles, the circuit may be preferentially serial for the water-urea solution and parallel for the thermal fluid. With respect to the thermal fluid pumps, the circuit may be serial or parallel, depending on whether boost pressure or redundancy is the more immediate concern.

According to some embodiments, the fluid dispensing system may provide a convenient method for thawing frozen urea or urea-water solutions, reducing the time to reach an operational condition from the frozen state, avoiding freeze damage, and/or regulating urea-water temperature for enhanced performance.

According to some embodiments, an open loop, fluid work circuit may include at least a fluid source, a fluid destination, a fluid pressurizing means, and a fluid flow interrupter means. An additional, closed loop, thermal management circuit may be integrated with the work circuit and may include heat transfer fluid, heating means, heat rejection means, pressure regulating means, pumping means, and a heat transfer fluid reservoir. The work circuit and thermal circuit may be in thermal communication. The work circuit and/or thermal circuit may be fluidly isolated.

According to some embodiments, a work circuit may include an atmospheric pressure fluid reservoir, a spray nozzle, a pulse pump, a pressure transducer, two ON/OFF electrically-operated valves, and/or a urea-water solution as a working fluid. The pulse pump may include a variable volume chamber for receiving a work fluid, wherein the variable volume chamber may be responsive to a variable volume chamber of a heat transfer fluid. A thermal management circuit may include a recirculated, freeze proof, heat transfer fluid (e.g., such as oil and/or a water-glycol solution), an electrically operated pump-motor unit, a line set that follows the work circuit (e.g., traces the work circuit), a variable volume pulse motor, a fluid flow restrictor (e.g., such as an orifice restrictor), a selectively operable electric resistance heater, a selectively operable radiator, and/or a variable volume reservoir.

According to some embodiments, a constant pressure for one or more spray nozzles may be provided by use of a fixed orifice and a pressure responsive variable speed pump in a thermal management circuit.

According to some embodiments, a low frequency operation and long pulse period of the pulse pump, pulse pump-motor, and thermal fluid reservoir, may be achieved, which may serve to maximize service life.

According to some embodiments the pulse pump-motor may be used as an intensifier, thereby allowing use of the thermal fluid pump to operate at a low pressure and power.

According to some embodiments, control of the temperature of a thermal fluid may be provided independently of whether a urea-water circuit is operating and/or whether an engine to which the system is coupled is operating.

According to some embodiments, a thermal fluid circuit of an SCR system may be separate and independent of an engine coolant system, which may reduce or eliminate the risk of losing engine coolant via the fluid dispensing system.

According to some embodiments, an SCR system may be brought to a functioning state by rapidly thawing a portion of a frozen urea-water solution by intentionally directing a relatively high heat input into a minimal volume and mass. Additionally, some embodiments may provide higher system reliability and lower cost by substituting a single resistance heater for multi-segmented resistance heaters.

According to some embodiments, it may be possible to minimize the number of system components in contact with a urea-water solution, which may have damaging characteristics due to corrosion and/or the effects of freezing.

According to some embodiments, use of a thermal fluid to cool an electric motor driving a thermal fluid pump may be used, thereby extending the useful life of the electric motor. For example, it may be possible to double the useful life of en electric motor, for example, by passing a thermal fluid through the electric motor. According to some embodiments, a fuel pump may be used.

At least some portions of exemplary embodiments of the systems outlined above may used in association with portions of other exemplary embodiments. Moreover, at least some of the exemplary embodiments disclosed herein may be used independently from one another and/or in combination with one another.

It will be apparent to those skilled in the art that various modifications and variations can be made to the structures and methodologies described herein. Thus, it should be understood that the invention is not limited to the subject matter discussed previously herein. Rather, the present invention is intended to cover modifications and variations.

What is claimed is:

1. A system for dispensing fluid, the system comprising;
a first fluid circuit, the first fluid circuit comprising,
    a first reservoir configured to contain a supply of a first fluid for being dispended,
    a first variable volume chamber in flow communication with the first fluid circuit, the first variable volume chamber being configured to increase and decrease in volume; and
a second fluid circuit configured to provide pressure for dispensing the first fluid, the second fluid circuit comprising,
    a second reservoir configured to contain a supply of a second fluid,
    fluid passages configured to provide fluid flow within the second fluid circuit,
    a pump configured to pump the second fluid within the fluid passages, and
    a second variable volume chamber in flow communication with the second fluid circuit, the second variable volume chamber being configured to increase and decrease in volume,
wherein the second fluid circuit is a closed-loop circuit,
wherein the first variable volume chamber and the second variable volume chamber are associated with one another, such that as the volume of the second variable volume chamber increases, the volume of the first variable volume chamber decreases, thereby dispensing the first fluid from the first fluid circuit, and
wherein the fluid passages of the second fluid circuit are associated with the first fluid circuit, such that flow of the second fluid in the second fluid circuit facilitates control of a temperature of the first fluid in the first fluid circuit.

2. The system of claim 1, further comprising a first fluid in the first fluid circuit, wherein the first fluid comprises at least one of a beverage, air, and a urea-water solution.

3. The system of claim 1, further comprising a second fluid in the second fluid circuit, wherein the second fluid comprises a fluid configured to be in liquid form at a temperature greater than about minus 40 degrees C.

4. The system of claim 1, further comprising a second fluid in the second fluid circuit, wherein the fluid comprises at least one of glycol and oil.

5. The system of claim 1, wherein the first variable volume chamber and the second variable volume chamber are hydraulically balanced with respect to one another.

6. The system of claim 1, wherein the first fluid circuit comprises
    a first fluid passage configured to provide flow communication between the first reservoir and the first variable volume chamber,
    a second fluid passage configured to provide flow communication between the first variable volume chamber and a nozzle configured to dispense the first fluid,
    a first valve located in the first fluid passage, and
    a second valve located in the second fluid passage,
    wherein the first and second valves are configured to control flow of the first fluid between the first reservoir and the nozzle.

7. The system of claim 6, wherein at least one of the valves comprises a solenoid valve.

8. The system of claim 1, wherein operation of the pump of the second fluid circuit is responsive to pressure in the first fluid circuit.

9. The system of claim 1, wherein the first fluid circuit is configured to provide flow of the first fluid in two directions within the first fluid circuit.

10. The system of claim 1, wherein the second fluid circuit is configured to provide flow of the second fluid in two directions within the second fluid circuit.

11. The system of claim 10, wherein the pump of the second fluid circuit is configured to provide fluid flow in two directions in the second fluid circuit.

12. The system of claim 1, wherein the first variable volume chamber is self-priming.

13. The system of claim 1, wherein the second fluid circuit is configured to provide cooling of the pump via flow of the second fluid.

14. The system of claim 13, wherein the pump comprises a housing having a passage for providing flow communication between the second fluid circuit and the housing, wherein flow of the second fluid through the passage of the housing provides cooling for the pump.

15. The system of claim 1, wherein the second fluid circuit comprises a plurality of pumps configured to pump the second fluid.

16. The system of claim 1, wherein the second fluid circuit comprises at least one of a radiator, a heat exchanger, a heater, and phase change material configured to facilitate control of a temperature of the second fluid.

17. The system of claim 1, wherein the first variable volume chamber and the second variable volume chamber comprise a barrier, and the system further comprises a sensor configured to detect when the barrier has reached a stroke limit within one of the first variable volume chamber and the second variable volume chamber.

18. The system of claim 17, wherein the sensor comprises at least one of a sensor configured to detect position of the barrier and a sensor configured to detect pressure.

19. A selective catalytic reduction system comprising the system of claim 1.

20. A beverage dispensing system comprising the system of claim 1.

21. A method for controlling dispensing and temperature of a first fluid in a first fluid circuit via flow of a second fluid in a second fluid circuit, the method comprising:
    flowing the second fluid in a closed-loop fluid circuit;
    controlling temperature of the second fluid; and
    controlling pressure of the second fluid, wherein flowing the second fluid results in affecting the temperature and flow of the first fluid in the first fluid circuit, and wherein the first fluid circuit comprises two valves configured to facilitate flow of the first fluid in two directions in the first fluid circuit, and the method further comprises operating the two valves responsive to flow of the second fluid in the second fluid circuit.

22. A method for controlling dispensing and temperature of a first fluid in a first fluid circuit via flow of a second fluid in a second fluid circuit, the method comprising:

flowing the second fluid in a closed-loop fluid circuit;
controlling temperature of the second fluid; and
controlling pressure of the second fluid,
wherein flowing the second fluid results in affecting the temperature and flow of the first fluid in the first fluid circuit,
wherein the method further comprises controlling flow rate of the second fluid in the second fluid circuit based on pressure in the first fluid circuit.

* * * * *